(12) United States Patent
Liu et al.

(10) Patent No.: US 11,429,921 B2
(45) Date of Patent: Aug. 30, 2022

(54) TRACKING SHIPMENTS WITH A LOCAL AND REMOTE BLOCKCHAIN

(71) Applicant: International Business Machines Corporation, Armonk, NY (US)

(72) Inventors: Su Liu, Austin, TX (US); John D. Wilson, League City, TX (US); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 15/383,266

(22) Filed: Dec. 19, 2016

(65) Prior Publication Data

US 2018/0174097 A1 Jun. 21, 2018

(51) Int. Cl.
*G06Q 10/08* (2012.01)
*H04L 9/32* (2006.01)
*H04L 9/00* (2022.01)

(52) U.S. Cl.
CPC ....... *G06Q 10/0833* (2013.01); *H04L 9/3239* (2013.01); *G06Q 2220/00* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2015/0269570 A1 | 9/2015 | Phan et al. | |
| 2015/0379511 A1 | 12/2015 | Hartling | |
| 2016/0098730 A1 | 4/2016 | Feeney | |
| 2016/0164884 A1 | 6/2016 | Sriram et al. | |
| 2016/0217436 A1 | 7/2016 | Brama | |
| 2017/0180134 A1* | 6/2017 | King | H04L 63/0853 |
| 2017/0300912 A1* | 10/2017 | Narasimhan | G06Q 20/40 |
| 2018/0020324 A1* | 1/2018 | Beauford | H04L 43/10 |
| 2018/0144298 A1* | 5/2018 | Rankin | H04L 9/34 |
| 2018/0167217 A1* | 6/2018 | Brady | H04L 67/10 |
| 2019/0197534 A1* | 6/2019 | Alastair | G06Q 20/38215 |

OTHER PUBLICATIONS

Dickson—Non-Patent Literature, "What is blockchain?"—TechTalks (Sep. 2016). (Year: 2016).*
Andreas M. Antonopoulos, "Mastering Bitcoin", Publisher: O'Reilly Media, Inc., Release Date: Dec. 2014, (hereinafter "Ant") (Year: 2014).*
"Vechain—Blockchain based anti-piracy system," https://bitse.com/?p=593, retrieved Aug. 18, 2016, 8 pages.
Jaag, Christian et al., "Blockchain Technology and Cryptocurrencies: Opportunities for Postal Financial Services," Swiss economics Working Paper No. 0056, 2016, 16 pages.
"Blockverify," http://www.blockverify.io/, retrieved Aug. 18, 2016, 9 pages.

* cited by examiner

*Primary Examiner* — Steven S Kim
*Assistant Examiner* — Jason B Fenstermacher

(57) ABSTRACT

A blockchain of transactions may be referenced for various purposes and may be later accessed by interested parties for ledger verification. One example method of operation may comprise one or more of identifying shipment locations for a product shipment, storing the shipment locations in a local blockchain, transmitting the shipment locations to a remote blockchain, comparing the shipment locations of the remote blockchain with the shipment locations stored in the local blockchain, and verifying the shipment locations of the remote blockchain are consistent with the shipment locations stored in the local blockchain.

17 Claims, 7 Drawing Sheets

250

```
FROM 226 OF FIG. 2A
230
```
↓
```
CURRENT WAYPOINT STORES A COPY OF THE LATEST
BLOCKCHAIN OF RFID TAG IN CLOUD
232
```
↓
```
CURRENT WAYPOINT BROADCASTS THE SIGNED BLOCK TO
ALL PRIOR WAYPOINTS
234
```
↓
```
EVERY PRIOR WAYPOINT VERIFIES THE NEWLY-CREATED
BLOCK WITH PUBLIC KEY OF CURRENT WAYPOINT
236
```
↓

237 — ◇ NEW BLOCK VALID — NO → REPORT EXCEPTION AND INTERRUPT SHIPPING 259

YES ↓

```
EVERY PRIOR WAYPOINT LINKS THE NEWLY CREATED BLOCK
TO THE BLOCKCHAIN STORED IN THE CLOUD FOR FUTURE
VERIFICATION
238
```

218

↓

239 — ◇ CUSTOMER RECEIVE GOODS — NO → 218

YES ↓

```
THE CUSTOMER VERIFIES EACH BLOCK IN THE RFID TAG WITH
SEPARATE PUBLIC KEY OF EACH SHIPPING WAYPOINT
242
```
↓
```
THE CUSTOMER VERIFIES BLOCKCHAIN COMPARING RECORD
IN RFID TAG WITH RECORD OF EACH WAYPOINT
244
```
↓
```
THE CUSTOMER VERIFIES THE GOODS AUTHENTICITY WITH
CORRESPONDING PUBLIC KEY OF ONE TIME VERIFICATION
246
```

FIG. 2B

TRACKING SHIPMENTS WITH A LOCAL AND REMOTE BLOCKCHAIN

TECHNICAL FIELD

This application relates to tracking shipments, and more particularly, to tracking shipments with a local and remote blockchain.

BACKGROUND

Counterfeit goods harm the interests of consumers, and in some severe cases, fake or inferior products, such as medicines can damage the health of people and even cause death. With the growth of global trade, identifying counterfeit goods and anti-counterfeiting technology have become increasingly popular. There are a number of existing anti-counterfeiting and brand protection solutions such as labelling or marking products with laser holograms, security inks, watermarks, chemicals or biochemical markers and other anti-counterfeiting approaches. Another approach is to use electronic identification for product anti-counterfeiting to verify the information stored in the electronic identification, or printed code, affixed to the product by a computing device. Verifying products via an online address associated with the electronic identification is also another approach to product verification.

All of those aforementioned approaches, however, have their own drawbacks. The many product counterfeiters in existence today have become adept at overcoming the existing validation methods. The labels, markers or electronic identification tied to the authentic product can be reused, falsified or tampered with and used on another counterfeit product. Another concern is that the anti-counterfeiting methods are only focused on verifying if the product is authentic or not; however, tracking and guaranteeing the shipment of the product are equally important to product anti-counterfeiting by ensuring that the authentic product can be delivered from manufacturer to the consumer.

SUMMARY

One example embodiment may include a method that comprises one or more of identifying a plurality of shipment locations for a product shipment, storing the plurality of shipment locations in a local blockchain, transmitting the plurality of shipment locations to a remote blockchain, comparing the plurality of shipment locations of the remote blockchain with the plurality of shipment locations stored in the local blockchain, and verifying the plurality of shipment locations of the remote blockchain are consistent with the plurality of shipment locations stored in the local blockchain.

Another example embodiment may include an apparatus that comprises one or more of a processor configured to identify a plurality of shipment locations for a product shipment, store the plurality of shipment locations in a local blockchain, a transmitter configured to transmit the plurality of shipment locations to a remote blockchain, and wherein the processor is further configured to compare the plurality of shipment locations of the remote blockchain with the plurality of shipment locations stored in the local blockchain, and verify the plurality of shipment locations of the remote blockchain are consistent with the plurality of shipment locations stored in the local blockchain.

Still another example embodiment may comprise a non-transitory computer readable storage medium configured to store instructions that when executed causes a processor to perform one or more of identifying a plurality of shipment locations for a product shipment, storing the plurality of shipment locations in a local blockchain, transmitting the plurality of shipment locations to a remote blockchain, comparing the plurality of shipment locations of the remote blockchain with the plurality of shipment locations stored in the local blockchain, and verifying the plurality of shipment locations of the remote blockchain are consistent with the plurality of shipment locations stored in the local blockchain.

BRIEF DESCRIPTION OF THE DRAWINGS

FIG. 2B illustrates a second part of a flow diagram for a blockchain-based product shipment tracking procedure according to example embodiments.

DETAILED DESCRIPTION

Figure 1:
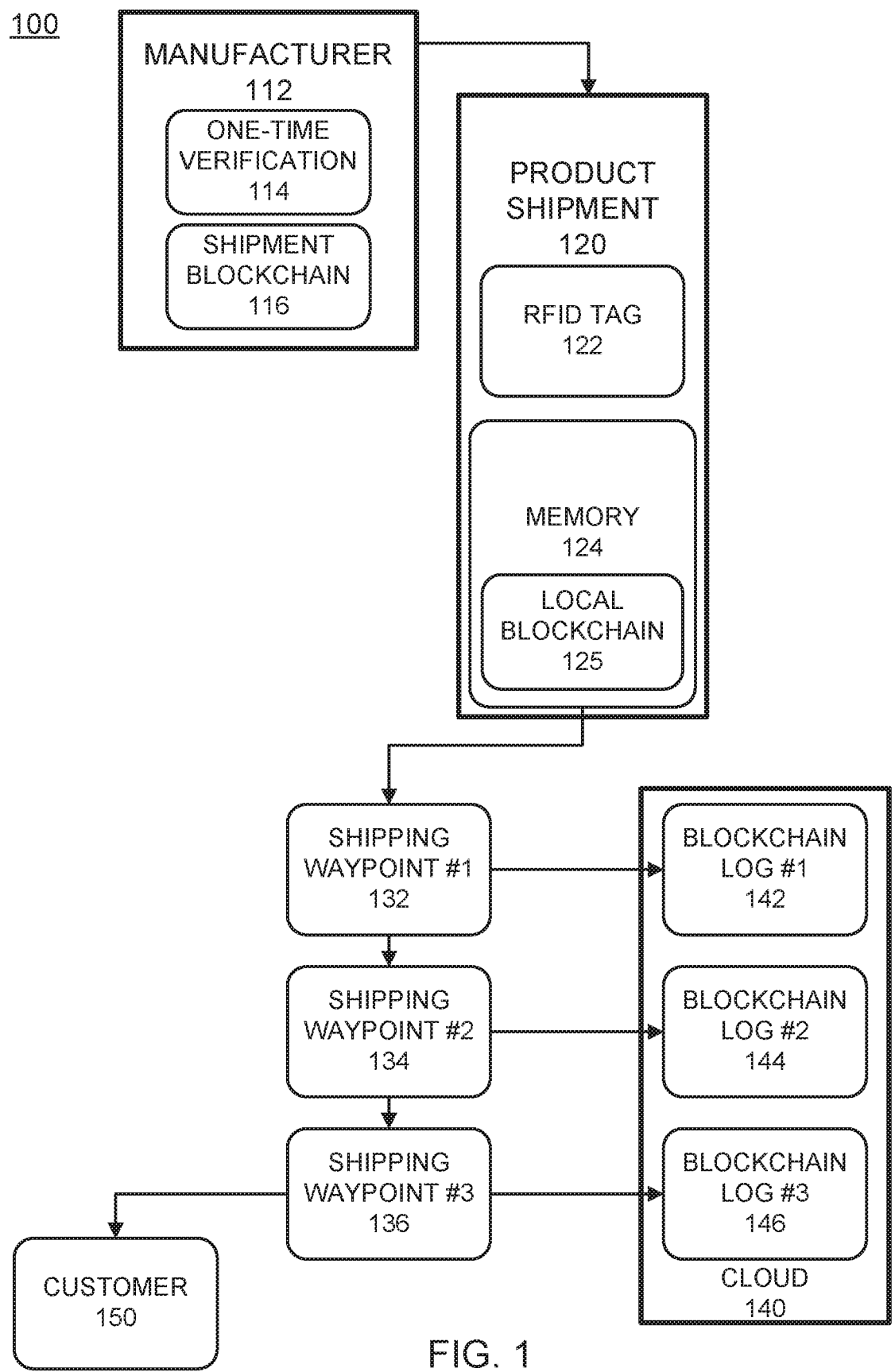
FIG. 1 illustrates a product creation and shipping platform for a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide storing tracking shipments with a blockchain and storing shipping waypoint information in a blockchain of a local memory co-located with the shipment and comparing that information with a public blockchain for product integrity.

Other embodiments provide using a blockchain, distributed ledger or public ledger to track and provide a guarantee that a shipment of goods is accurately identified during a shipment and verifying authenticity of the goods with a verification procedure (such as a one-time verification procedure). A combination of a goods/product origination verification (i.e., one-time verification) and shipment verification(s) offers product authenticity. In one example, a contactless readable/writable unit (e.g., RFID tag, smart-card, etc.) is embedded within or associated with a product shipment box, bottle, product body, etc. A blockchain configuration can be used to process and track the shipment of goods/products. The blockchain recorded data is compared to the contactless readable/writable unit with its own blockchain data recorded. Every shipping waypoint with its own blockchain data stored in a remote blockchain (i.e., cloud) can be used to compare against the local blockchain data in the readable unit for shipment verification. Asymmetric cryptography can be used to verify a goods origination and determine the first verification with a one-time verification method. Shipment verification for the existing blockchain data, including the prior shipping waypoints, may be performed by the current shipping waypoint with an electronic device. Also, a product origination verification and shipment verification by the consumer with a smart device (e.g., smartphone) may be used to track the shipment.

The one-time verification may be a sub-process that includes a 2D-barcode (UPC, QR, etc.). The barcode could be a product/item encrypted with the manufacturer's private key and a verification code encrypted with a unique symmetric key. The user application on the smartphone or device may scan the barcode and extract/decrypt unique product/item serial data using the manufacturer's public key associated with the above private key. Along with the encrypted verification code being extracted, the user smart device application encrypts the product/item serial data with the manufacturer's public key and transmits that data to a manufacturer verification interface. The manufacturer may then send back the unique symmetric key associated with the verification code, and the user decrypts the verification code. The user transmits the decrypted verification code to the manufacturer which validates the code and verifies that it is the first (and in one embodiment, only) transaction associated with the verification code.

A "peer supervision" method for tracking a shipment may be used by having all shipping waypoints verify each other to supervise the shipment together. Any shipping waypoint may include any location or service center that has identified the package of goods by its shipping information or tracking information and has logged such information for inclusion in the local blockchain and/or the remote blockchain. The examples provide a rapid and sensitive method to track the shipment which is conducive to timely detection of problems during shipment by shipping waypoints. Using a one-time verification can prove the goods' origination, and avoid unwanted parties from attempting to reuse the same product ID, tag or address associated with the authentic goods. The consumer could verify not only the goods' origination but also the shipment of the goods/products. The manufacturer of the product, the shipping waypoint centers and/or the consumers can access the blockchain data collectively to identify and prevent counterfeit goods by verifying authenticity of the goods.

The goods/products may include a box, container, or other shipping mechanism that houses the product and the contactless readable/writable unit (e.g., RFID tag, smart-card, etc.) within the goods or packaging container (e.g. box, bottle, packing bag, etc.). The tag may also be affixed to the product itself in certain scenarios. The cloud services could be used to record the shipment blockchain including information pertaining to the goods and shipment information by each shipping waypoint. The contactless readable/writable unit and the cloud services can be enabled with an append-only property that creates immutability and reduces the likelihood of modification or tampering. Users may append information to the storage unit memory blockchain without being able to modify the existing information previously stored. In order to track and guarantee the shipment of the goods, the blocks created of all shipping waypoints are linked in sequence based on time to form a chain corresponded to the shipment. Each shipping waypoint may submit a private key and a public key used for crypto and digital signature (i.e., shipment verification keys). Current shipping waypoints create a new block to record the latest shipping information, or a hash value of the information, of the goods. This shipping information may include a current shipping, time, location, product attributes (i.e., description, size, weight, condition, etc.) and prior blocks which are retrieved to link to the current shipping information block. The new block is signed with a private key, and current shipping waypoints link the new block to the blockchain stored in the embedded readable/writable unit of the goods (local blockchain).

The current shipping waypoint can broadcast the new block to all previous shipping waypoints so those waypoint centers can verify and update their blockchain data as well. For example, a current shipping waypoint system may copy the updated blockchain in its customized data cloud service. In order to verify the shipment of the goods, this method would also include the current shipping waypoint (or the consumer) verifying the existing blocks stored in the embedded readable/writable unit with corresponding public keys of the shipping waypoints by comparing that data with the blockchain stored in a cloud service of each previous shipping waypoint system.

When receiving a block broadcast by a current shipping waypoint, each previous shipping waypoint verifies the block with a public key of a current shipping waypoint, and links the block to the blockchain stored in a cloud service if the received block is deemed valid. The shipment is deemed authentic if the blocks and the blockchain, stored in the embedded readable/writable unit, are valid based on the blocks in the cloud blockchain. To verify the origination of the goods, the method could also include linking the blockchain data of the embedded readable/writable unit of the goods container to a private key and a public key as origination verification keys. The manufacturer would sign some information with the private key to store in the embedded readable/writable unit. The consumer can interact with the manufacturer via a cloud service to verify the signed information with the public key. The goods' origination is authenticated when a first valid verification occurs.

FIG. 1 illustrates a product creation and shipping platform 100 for a blockchain according to example embodiments. Referring to FIG. 1, goods being delivered from a manufacturer to consumers through several shipping waypoints may include the manufacturer (via a computer) 112, establishing a one-time verification 114 and a shipment blockchain 116 to track the product. A RFID tag 122 may be embedded inside of the product shipment 120 to record the local or shipment blockchain 125 in memory 124, and store the information signed by the manufacturer for the one-time verification. The manufacturer 112 provides one-time verification service (for example, on the cloud) and the manufacturer and all shipping waypoints record the shipment blockchain on their cloud services separately. As a result, when a user intends to verify whether the goods are authentic or not, the origination of the goods and the shipment can be verified from the blockchain data. The user can use a smart device (e.g., smartphone) to read the information of the one-time verification in the RFID tag, and interact with the one-time verification service of the manufacturer to prove origination. Furthermore, the user can use the smart device to verify and compare the shipment stored blockchain in the RFID with the shipment block chain recorded by the manufacturer and all shipping waypoints. If the one-time verification service of the manufacturer indicates that the information passes verification, the verification happened one time, and the shipment blockchain records are valid, then the goods are deemed authentic. The shipping waypoints 132, 134 and 136 are all locations where the blockchain logs 142, 144 and 146 stored in the cloud 140 may receive a new block based on the updated shipping information at any one of the waypoints. The customer 150 may also access the blockchain data simply by using a mobile device to check the product origin from the RFID tag or memory device embedded in the product.

Figure 2A:
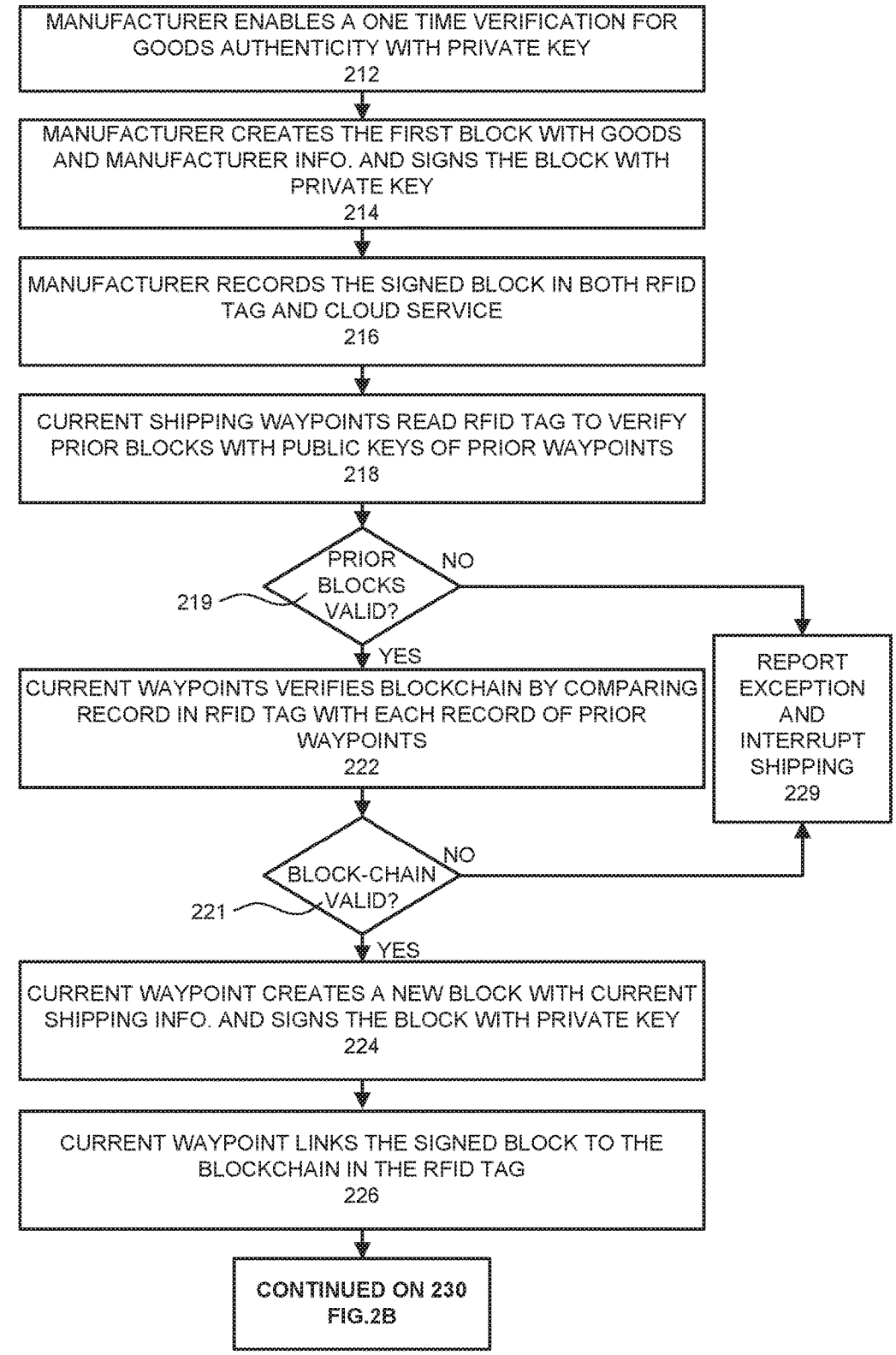
FIG. 2A illustrates a first part of a flow diagram for a blockchain-based product shipment tracking procedure according to example embodiments.

FIG. 2A illustrates a first part of a flow diagram 200 for a blockchain-based product shipment tracking procedure in which one or more of the following steps may occur according to example embodiments. Referring to FIG. 2A, for simplicity, the RFID tag will be used as the contactless readable/writable unit associated with the goods, however, any type of unit may be used to store blockchain data with the product. The manufacturer enables a one-time verification 212 for goods authenticity with a private key. The manufacturer creates the first block with goods and manufacturer information 214, and signs the block with its private key. The manufacturer records the signed block in the RFID tag and cloud service at the same time 216. Current shipping waypoints read the RFID tag to verify prior blocks with public keys of prior waypoints 218. If any block in the current blockchain are not valid 219, then an exception is reported 229 and the goods shipping may be interrupted. If the blocks are valid, then the current waypoint verifies a blockchain 221 by comparing a record in the RFID tag with each record of prior waypoints 222. If a different blockchain is found, that is invalid, then an exception and interrupt occurs 229. If not, the current waypoint creates a new block with current shipping information and signs the block with its private key 224. The current waypoint links the signed block to the blockchain stored in the RFID tag memory 226.

FIG. 2B illustrates a second part of a flow diagram 250 for a blockchain-based product shipment tracking procedure in which one or more of the following steps may occur according to example embodiments. In FIG. 2B, the current waypoint stores a copy of the latest blockchain in the remote blockchain cloud service 232. The current waypoint broadcasts the signed block to all prior waypoints 234. Every prior waypoint verifies the newly-created block with public key of current waypoint 236. If the newly-created block is not valid 237, then an exception is reported which interrupts the goods shipping 259. Or, every prior waypoint links the newly-created block to the blockchain stored in the separate cloud service blockchain for future verification 238. If the goods reach the next shipping waypoint and not the customer 239, then the process proceeds to operation 218 to verify a current blockchain and create a next block. Or, if the customer has received the goods, the customer verifies each block in the RFID tag with a separate public key of each shipping waypoint 242. The customer verifies a blockchain by comparing the record in RFID tag memory local blockchain with a record of each waypoint 244. The customer verifies the goods' authenticity with a corresponding public key one-time verification 246 using the blockchain/public ledger to track and guarantee the shipment of goods and verify authenticity of the goods.

Figure 3:
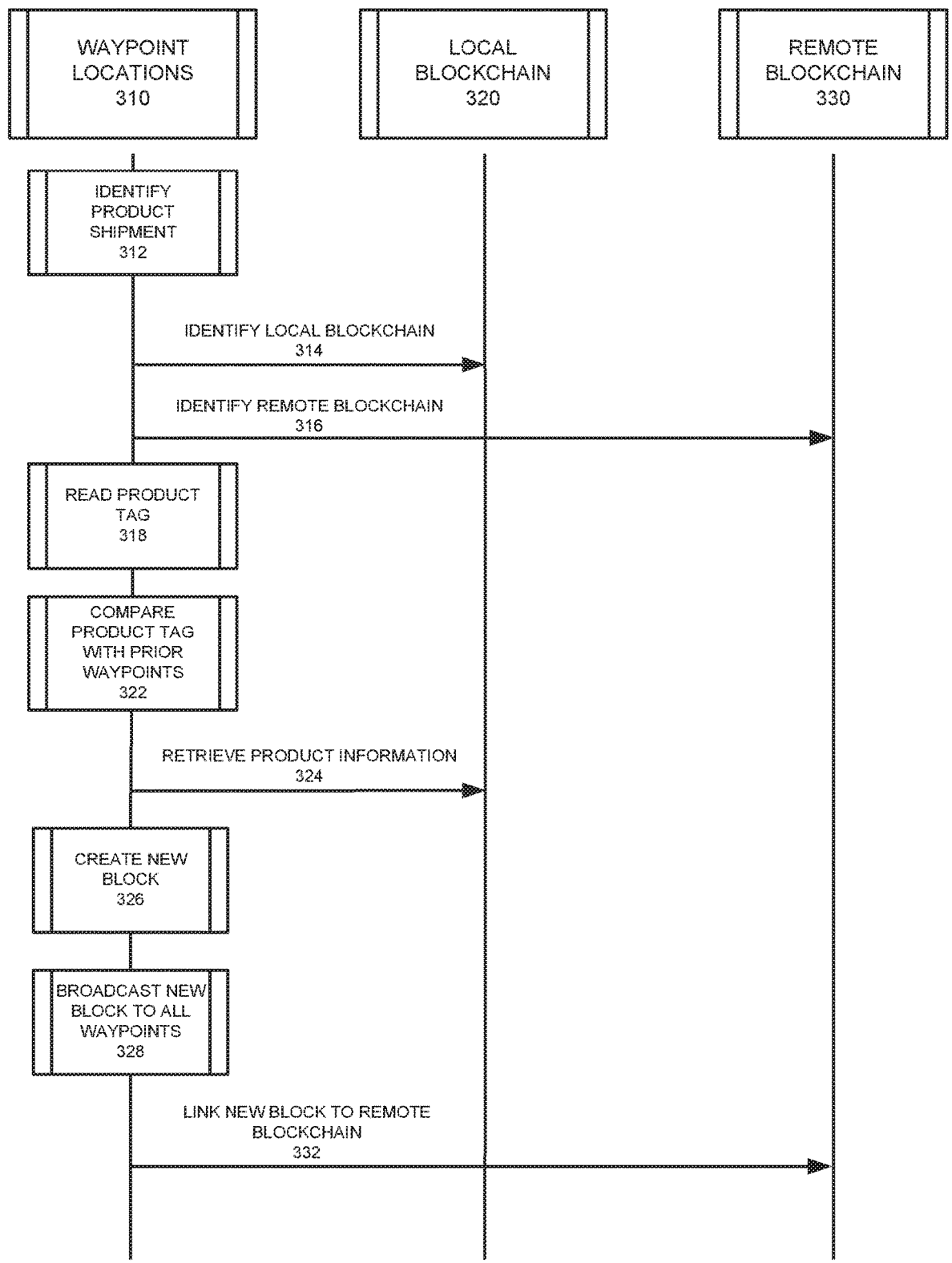
FIG. 3 illustrates an example system messaging configuration platform for tracking shipments in the blockchain according to example embodiments.

FIG. 3 illustrates an example system messaging configuration platform for tracking shipments in which one or more of the following actions may occur in the blockchain(s) according to example embodiments. Referring to FIG. 3, the system 300 includes one or more waypoints 310 as locations where the shipping package may be identified or registered during a shipment process and where blockchain transactions are written to the blockchain. The product shipment 312 may be linked to a particular waypoint by a registration process, UPC code scanning procedure, etc. The local blockchain 320 may be stored in a memory of the product itself or its shipment container and the remote blockchain 330 may be used to store the same information regarding the package for further verification. In this example, the local blockchain and the remote cloud blockchain are update 314/316 to identify the product having been received at the particular waypoint station. The product may have its tag read or scanned 318 and that process may also include comparing the product tag with prior waypoints 322 to verify previous locations of interest and accuracy of the data stored in the local and remote blockchains. The blockchain data can also be retrieved 324 by a reader device to perform a verification and to determine whether to create a new transaction/block 326 to register the latest waypoint. The new block can be broadcast to all waypoints 328 to permit the blockchains of any waypoints to be updated and to verify the accuracy of the blockchain data local and remote that has been received and stored at this point. The new block may be associated with the current waypoint's blockchain 332 for subsequent audit efforts of the product tracking record.

Figure 4A:
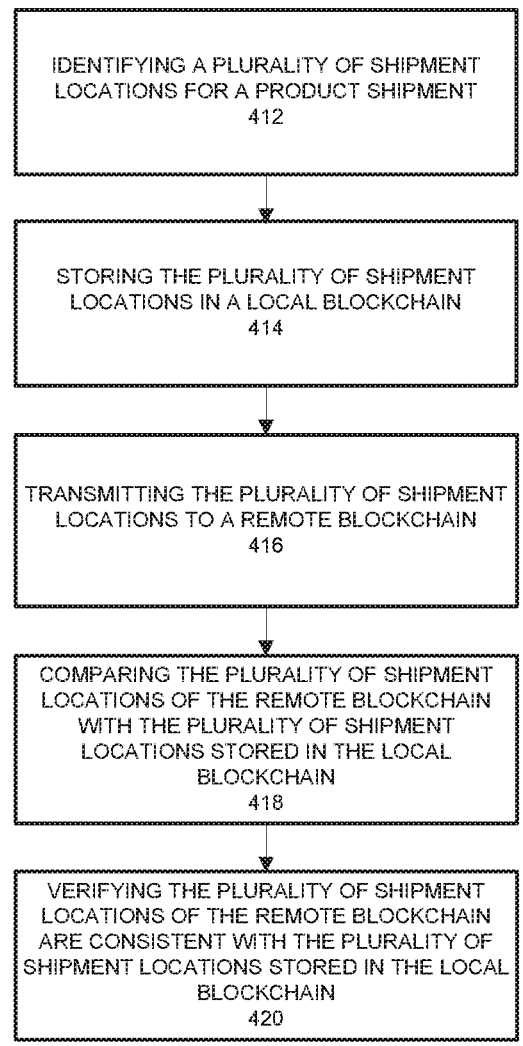
FIG. 4A illustrates a flow diagram of an example method of tracking product shipping transactions according to example embodiments.

FIG. 4A illustrates a flow diagram of an example method of tracking product shipping transactions according to example embodiments. Referring to FIG. 4A, the method 400 includes one or more of identifying a plurality of shipment locations for a product shipment 412, storing the plurality of shipment locations in a local blockchain 414, transmitting the plurality of shipment locations to a remote blockchain 416, comparing the plurality of shipment locations of the remote blockchain with the plurality of shipment locations stored in the local blockchain 418, and verifying the plurality of shipment locations of the remote blockchain are consistent with the plurality of shipment locations stored in the local blockchain 420. The method also includes storing the local blockchain in a static memory affixed to the product shipment, updating the remote blockchain each time the product shipment is verified at one or more of the plurality of shipment locations, and updating the local blockchain each time the product shipment is verified at one or more of the plurality of shipment locations. The local blockchain is linked to a private key associated with a manufacturer related to the product shipment and a public key. The method may also include verifying a current shipping waypoint among the plurality of shipment locations by comparing a public key associated with the current shipping waypoint with one or more existing blocks of the local blockchain and receiving one or more blocks broadcasted by a current shipping waypoint among the plurality of shipment locations and verifying the one or more blocks received with a public key of the current shipping waypoint, and linking the one or more blocks received with the remote blockchain when the one or more blocks received are valid.

Figure 4B:
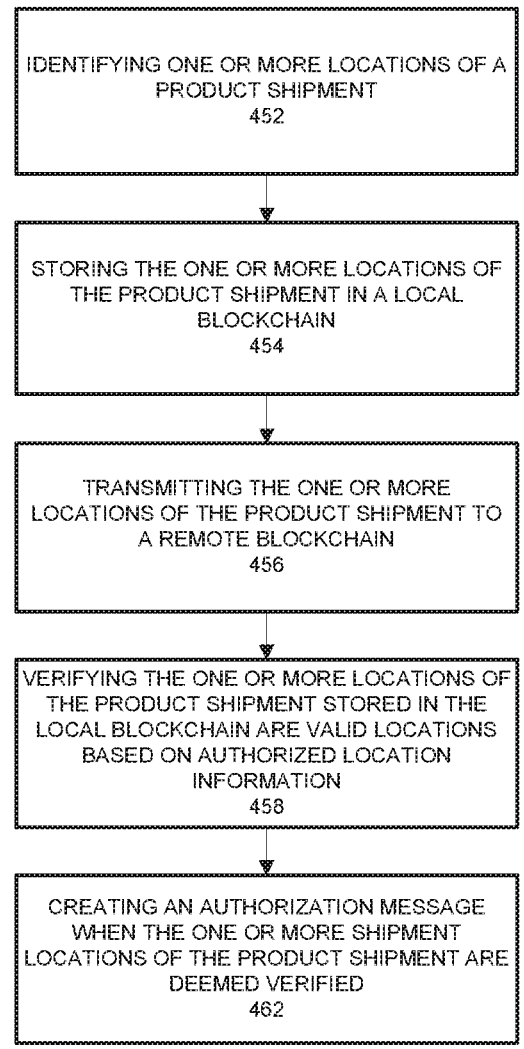
FIG. 4B illustrates a flow diagram of another example method of tracking product shipping transactions according to example embodiments.

FIG. 4B illustrates a flow diagram of another example method of tracking product shipping transactions according to example embodiments. Referring to FIG. 4B, the method 450 includes one or more of identifying one or more locations of a product shipment 452, storing the one or more locations of the product shipment in a local blockchain 454, transmitting the one or more locations of the product shipment to a remote blockchain 456, verifying the one or more locations stored in the local blockchain are valid locations based on authorized location information stored in the remote blockchain 458, and creating an authorization message when the one or more shipment location are deemed valid 462. In this embodiment, the blockchain could include store additional information about the parties involved in the transactions. Attributes of the parties could be geographic location (i.e., IP address, GPS, etc.). Those locations may be deemed valid and updated dynamically, and once the product is received at the store or the end user, the application permits a check for authentication based on acceptable location information stored in the local blockchain and validated by the remote blockchain information.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
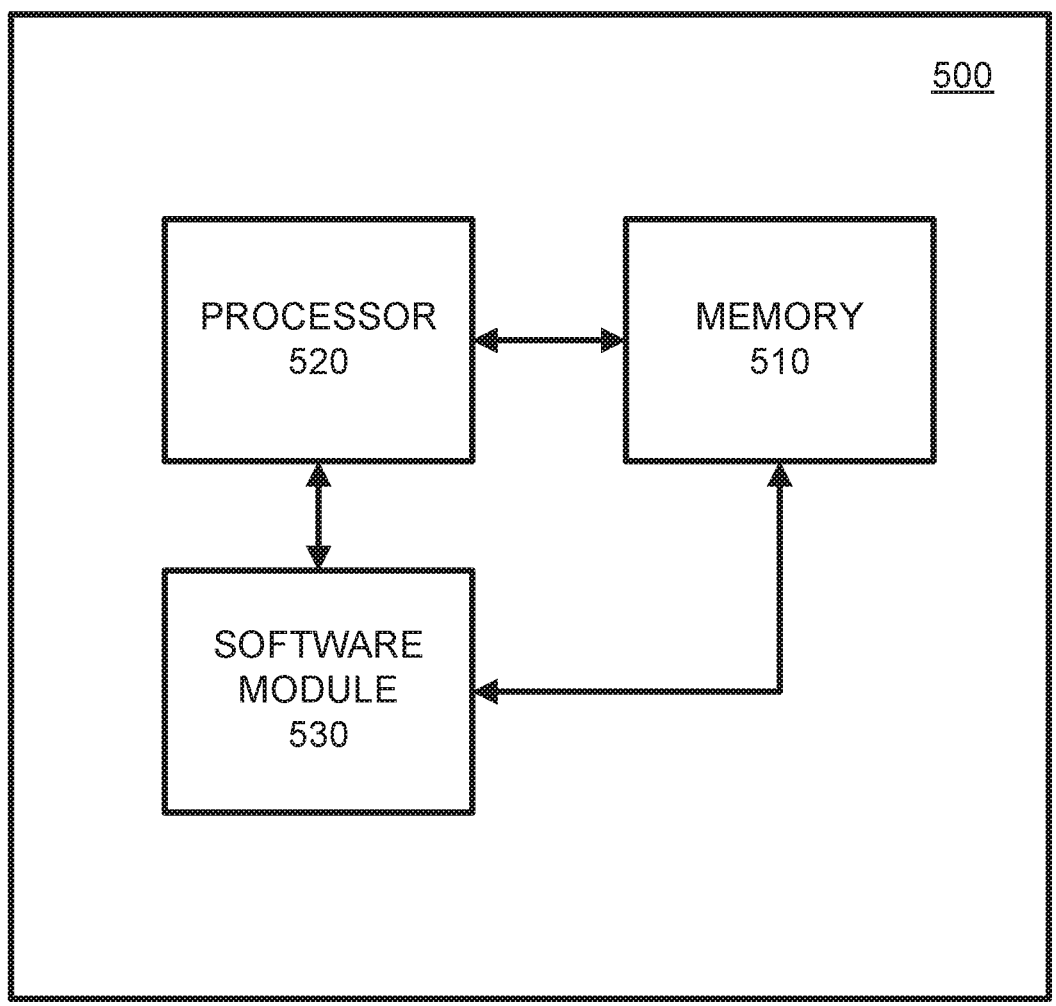
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, by a processor at a current waypoint location, a plurality of prior waypoint locations stored in a local blockchain stored in a memory affixed to a product shipment;
   transmitting, by the processor, the plurality of prior waypoint locations to a remote blockchain for storage;
   comparing, by the processor, the plurality of prior waypoint locations stored in the remote blockchain with the plurality of prior waypoint locations stored in the local blockchain;
   verifying, by the processor, that the plurality of prior waypoint locations of the remote blockchain are consistent with the plurality of prior waypoint locations stored in the local blockchain;
   creating, by the processor, a new blockchain block storing current information associated with the product and signed with a private key associated with the current waypoint location;
   broadcasting, by the processor, the new blockchain block to all of the prior waypoint locations for verification by the prior waypoint locations; and
   linking, by the processor, the new blockchain block to the remote blockchain in response to the verification.

2. The method of claim 1, further comprising:
   updating the remote blockchain each time the product shipment is verified at one or more of the plurality of prior waypoint locations.

3. The method of claim 1, further comprising:
   updating the local blockchain each time the product shipment is verified at one or more of the plurality of prior waypoint locations.

4. The method of claim 1, wherein the local blockchain is linked to a private key associated with a manufacturer related to the product shipment and a public key.

5. The method of claim 1, further comprising:
   verifying the current waypoint location by comparing a public key associated with the current waypoint location with one or more existing blocks of the local blockchain.

6. The method of claim 1, further comprising:
   linking the one or more blocks received with the remote blockchain when the one or more blocks received are valid.

7. An apparatus, comprising:
   a processor, at a current waypoint location, configured to:
      identify a plurality of prior waypoint locations stored in a local blockchain stored in a memory affixed to a product shipment; and
   a transmitter, at the current waypoint location, configured to transmit the plurality of prior waypoint locations to a remote blockchain for storage,
   wherein the processor is further configured to:
      compare the plurality of prior waypoint locations stored in the remote blockchain with the plurality of prior waypoint locations stored in the local blockchain, and
      verify that the plurality of prior waypoint locations of the remote blockchain are consistent with the plurality of prior waypoint locations stored in the local blockchain,
      create a new blockchain block storing current information associated with the product and signed with a private key associated with the current waypoint location,
      broadcast the new blockchain block to all of the prior waypoint locations for verification by the prior waypoint locations; and
      link the new blockchain block to the remote blockchain in response to the verification.

8. The apparatus of claim 7, wherein the processor is further configured to:
   update the remote blockchain each time the product shipment is verified at one or more of the plurality of prior waypoint locations.

9. The apparatus of claim 7, wherein the processor is further configured to:
   update the local blockchain each time the product shipment is verified at one or more of the plurality of shipment locations.

10. The apparatus of claim 7, wherein the local blockchain is linked to a private key associated with a manufacturer related to the product shipment and a public key.

11. The apparatus of claim 7, wherein the processor is further configured to:
    verify the current waypoint location by comparing a public key associated with the current waypoint location with one or more existing blocks of the local blockchain.

12. The apparatus of claim 7,
    wherein the processor is configured to link the one or more blocks received with the remote blockchain when the one or more blocks received are valid.

13. A non-transitory computer readable storage medium configured to store one or more instructions that when executed by a processor at a current waypoint location cause the processor to perform:
    identifying a plurality of prior waypoint locations stored in a local blockchain stored in a memory affixed to a product shipment;
    transmitting the plurality of prior waypoint locations to a remote blockchain for storage;

comparing the plurality of prior waypoint locations stored in the remote blockchain with the plurality of prior waypoint locations stored in the local blockchain;

verifying that the plurality of prior waypoint locations of the remote blockchain are consistent with the plurality of prior waypoint locations stored in the local blockchain;

creating a new blockchain block storing current information associated with the product and signed with a private key associated with the current waypoint location;

broadcasting the new blockchain block to all of the prior waypoint locations for verification by the prior waypoint locations; and linking the new blockchain block to the remote blockchain in response to the verification.

14. The non-transitory computer readable storage medium of claim 13, wherein the one or more instructions are further configured to cause the processor to perform:

updating the remote blockchain each time the product shipment is verified at one or more of the plurality of prior waypoint locations.

15. The non-transitory computer readable storage medium of claim 13, wherein the one or more instructions are further configured to cause the processor to perform:

updating the local blockchain each time the product shipment is verified at one or more of the plurality of shipment locations.

16. The non-transitory computer readable storage medium of claim 13, wherein the local blockchain is linked to a private key associated with a manufacturer related to the product shipment and a public key.

17. The non-transitory computer readable storage medium of claim 13, wherein the one or more instructions are further configured to cause the processor to perform:

verifying the current waypoint location by comparing a public key associated with the current waypoint location with one or more existing blocks of the local blockchain;

and linking the one or more blocks received with the remote blockchain when the one or more blocks received are valid.

* * * * *